US012714125B2

(12) United States Patent
Skandarioon et al.

(10) Patent No.: US 12,714,125 B2
(45) Date of Patent: Aug. 25, 2026

(54) STICK HANDLING APPARATUS, AN ICE CREAM PRODUCTION SYSTEM AND A METHOD FOR PRODUCING ICE CREAM

(71) Applicant: Tetra Laval Holdings & Finance S.A., Pully (CH)

(72) Inventors: Cameron Skandarioon, Tranbjerg (DK); Edison Kubo, Sao Paulo (BR)

(73) Assignee: Tetra Laval Holdings & Finance S.A., Pully (CH)

( * ) Notice: Subject to any disclaimer, the term of this patent is extended or adjusted under 35 U.S.C. 154(b) by 283 days.

(21) Appl. No.: 18/258,855

(22) PCT Filed: Nov. 4, 2021

(86) PCT No.: PCT/EP2021/080638
§ 371 (c)(1),
(2) Date: Jun. 22, 2023

(87) PCT Pub. No.: WO2022/144121
PCT Pub. Date: Jul. 7, 2022

(65) Prior Publication Data
US 2024/0041063 A1 Feb. 8, 2024

(30) Foreign Application Priority Data
Dec. 28, 2020 (EP) .................................... 20217349

(51) Int. Cl.
*A23G 9/00* (2006.01)
*A23G 9/22* (2006.01)
(Continued)

(52) U.S. Cl.
CPC ............ *A23G 9/265* (2013.01); *A23G 9/228* (2013.01); *A23G 9/503* (2013.01);
(Continued)

(58) Field of Classification Search
CPC ......... A23B 9/228; A23B 9/265; A23B 9/503; B41M 5/0076; B65G 15/30; B65G 2201/0282
See application file for complete search history.

(56) References Cited

U.S. PATENT DOCUMENTS

2013/0333404 A1* 12/2013 Yong ..................... A23G 9/083 62/129
2014/0072681 A1 3/2014 Dent

FOREIGN PATENT DOCUMENTS

CN 110245965 B 5/2020
CN 111332742 A * 6/2020 ............ B65G 47/24
(Continued)

OTHER PUBLICATIONS

International Search Report mailed Feb. 2, 2022, for priority International Application No. PCT/EP2021/080638.

*Primary Examiner* — Eyamindae C Jallow
(74) *Attorney, Agent, or Firm* — Lawrence S. Drasner

(57) ABSTRACT

A stick handling apparatus for handling ice cream sticks, said apparatus comprising a magazine arranged to hold ice cream sticks, a conveyor band arranged to retrieve ice cream sticks from the magazine, a stacker unit arranged to retrieve ice cream sticks from the conveyor band and to stack the ice cream sticks one after the other, a stick placing unit arranged to receive the ice cream sticks from the stacker unit for positioning the ice cream sticks inside a piece of ice cream mass, and a printer unit configured to print information on the ice cream sticks while the ice cream sticks are conveyed by the conveyor band.

8 Claims, 8 Drawing Sheets

(51) Int. Cl.
*A23G 9/26* (2006.01)
*A23G 9/50* (2006.01)
*B41M 5/00* (2006.01)
*B65G 15/30* (2006.01)

(52) U.S. Cl.
CPC ........... *B41M 5/0076* (2013.01); *B65G 15/30* (2013.01); *B65G 2201/0282* (2013.01)

(56) References Cited

FOREIGN PATENT DOCUMENTS

| | | | | | |
|---|---|---|---|---|---|
| CN | 212144975 | U | * | 12/2020 | |
| EP | 3184447 | A1 | | 6/2017 | |
| KR | 102125867 | B1 | | 6/2020 | |
| PL | 230747 | B1 | | 12/2018 | |
| WO | WO-9622697 | A1 | * | 8/1996 | ............. A23G 9/265 |
| WO | 1998018341 | A1 | | 5/1998 | |
| WO | WO-9818341 | A1 | * | 5/1998 | ............. A23G 9/265 |
| WO | WO-2019242827 | A1 | * | 12/2019 | ............. A23G 9/265 |

* cited by examiner

STICK HANDLING APPARATUS, AN ICE CREAM PRODUCTION SYSTEM AND A METHOD FOR PRODUCING ICE CREAM

TECHNICAL FIELD

The invention generally relates to ice cream production. More particularly, it is related to a stick handling apparatus, an ice cream production system and a method for producing ice cream.

BACKGROUND ART

Today it is well known to use equipment for handling ice cream sticks in ice cream production. For instance, in extrusion lines it is known to have servo engine-equipped pusher units capable to insert sticks in extruded ice cream mass at high speeds. It is also known to have stick handling apparatuses for moulded ice cream products. By having different concepts for producing and also by having different types of stick handling apparatuses, a large variety of different types of ice cream products with sticks can be offered.

One way of distinguishing a stick provided ice cream product from other similar products is to have a differently shaped stick. For instance, having an hourglass shaped stick can make the product easier to hold by a consumer.

Another way of distinguishing is to have a print on the stick. In addition to make the product stand out from products with non-printed standard sticks, this print may be used for information purposes. For instance, unique information may be printed on the stick such that it becomes possible to conduct product quality tracing as well as production efficiency analysis. The collected information can then be used to control the ice cream production process more efficiently.

Several techniques for producing and marking by printing ice cream sticks are available today, and companies producing and printing ice cream sticks have automatized their production such that the ice cream sticks can be produced cost efficiently.

Even though it is possible to produce a large variety of stick provided ice cream products, it is desired by ice cream producers to have even more possibilities to produce stick provided ice cream products that are efficiently traceable, making it possible to more accurately relate unique ice cream units to different steps of the production process.

SUMMARY

It is an object of the invention to at least partly overcome one or more of the above-identified limitations of the prior art. In particular, it is an object to provide a stick handling apparatus that can facilitate improved product tracing and offer better possibilities to accurately analyze ice cream production.

According to a first aspect it is provided a stick handling apparatus for handling ice cream sticks, said apparatus comprising a magazine arranged to hold ice cream sticks, a conveyor band arranged to retrieve ice cream sticks from the magazine, a stacker unit arranged to retrieve ice cream sticks from the conveyor band and to stack the ice cream sticks one after the other, a stick placing unit arranged to receive the ice cream sticks from the stacker unit for positioning the ice cream sticks inside a piece of ice cream mass, and a printer unit configured to print information on the ice cream sticks while the ice cream sticks are conveyed by the conveyor band.

An advantage with having the printer unit included in the stick handling apparatus is that a more versatile apparatus in terms of printing is achieved. By having the sticks printed just before positioning the sticks in the ice cream mass, often less than a few minutes before, it is possible to control and trace much more accurately which stick is positioned inside which ice cream. Depending on what data is printed, it is also possible to trace products more accurately as well as to make more reliable and exact production analysis.

Still an advantage is that since the print is made after the sticks have been aligned and directed on the conveyor band, it is possible to have different prints on first ends that are inserted into the ice cream mass and second ends not inserted into the ice cream mass.

The stick handling apparatus may further comprise a sensor arranged to detect a speed by which the ice cream sticks are conveyed by the conveyor band, wherein the printer unit is configured to use said speed as input when printing information on the ice cream sticks.

An advantage with having the sensor for detecting the speed of the conveyor band is that the printing can be adapted accordingly. By knowing the speed, printing position can be adapted in a direction of movement of the conveyor band.

The conveyor band may comprise slots that are arranged to hold a respective ice cream stick, the apparatus may further comprise a sensor arranged to generate data indicative of absence of a stick in a slot, wherein the printer unit is configured to use said data as input when printing information on the ice cream sticks.

An advantage with the sensor for detecting void slots, i.e. that there are slots in which the sticks are absent, is that printing can be avoided in case of void slots, which has the positive effect that no printing is made on the conveyor band.

Each ice cream stick may comprise a first end and a second end, the printer unit may be configured to provide different prints on the two ends of each ice cream stick, and the conveyor band, the stacker unit and the stick placing unit may be arranged to convey, stack and place all ice cream sticks such that all first ends of the ice cream sticks face the same direction and are positioned inside a respective piece of ice cream mass. Here all first ends means all first ends of a set of sticks, such as a set of at least 10000 sticks.

An advantage with having the sticks handled such that the first ends are all facing the same direction is that part of the print may be visible for product quality tracing before the ice cream is packaged. Having this possibility provides additional possibilities for ice cream producers.

Different prints should be construed as that a first print may be provided on the first end and that a second print may be provided on the second end, but also that print is only provided on the first end or only on the second end.

The printer unit may be configured to provide different prints on each ice cream stick of a set of ice cream sticks.

Having different prints on each ice cream stick provides for improved traceability. For instance, if quality issues is found in a late stage, even after the ice cream products are shipped from the production site, the print on the stick may be used for identifying where the ice cream product was produced, when it was produced and in which machine. With this information at hand, quality problems can be addressed quicker. Additionally, in case it is found that the ice cream products are not safe to consume, the print on the stick can be used for identification purposes, which provides for improved food safety.

The printer unit may be a laser printer.

The conveyor band may comprise slots that are arranged to hold a respective ice cream stick, each slot may comprise a first wall and a second wall that is opposite the first wall, wherein the second wall is, as seen in a direction of movement of the conveyor band, trailing the first wall, and is arranged to support a longitudinal side of an ice cream stick.

An advantage with having the second wall supporting the longitudinal side is that the stick is aligned. Having the stick adequately aligned comes with the positive effect that the print can be provided with higher precision in terms of position.

According to a second aspect it is provided an ice cream production system comprising an ice cream freezer arranged to produce ice cream mass, an ice cream forming apparatus arranged to shape the ice cream mass into individual pieces of ice cream mass, a freezing apparatus arranged to receive the individual pieces of ice cream mass and to reduce their temperature, a packaging machine arranged to wrap package material around each individual piece of ice cream mass, a stick handling apparatus according to the first aspect, arranged to position ice cream sticks inside each individual piece of ice cream mass.

The same features and advantages as presented for the first aspect may be implemented for the second aspect.

According to a third aspect it is provided a method for producing ice cream, comprising producing ice cream mass, shaping the ice cream mass into individual pieces of ice cream mass, positioning ice cream sticks inside each individual piece of ice cream mass using a stick handling apparatus, reducing the temperature of the individual pieces of ice cream mass, wrapping package material around each individual piece of ice cream mass. The method comprises, before positioning ice cream sticks inside each individual piece of ice cream mass, conveying the ice cream sticks in a stick handling apparatus, on a conveyor band from a magazine to a stacker unit for the ice cream sticks, and printing information on the ice cream sticks while the ice cream sticks are conveyed on the conveyor band.

The same features and advantages as presented for the first and second aspects may be implemented for the third aspect.

Still other objectives, features, aspects and advantages of the invention will appear from the following detailed description as well as from the drawings.

BRIEF DESCRIPTION OF THE DRAWINGS

Embodiments of the invention will now be described, by way of example, with reference to the accompanying schematic drawings, in which.

DETAILED DESCRIPTION

Figures 1A, 1B:
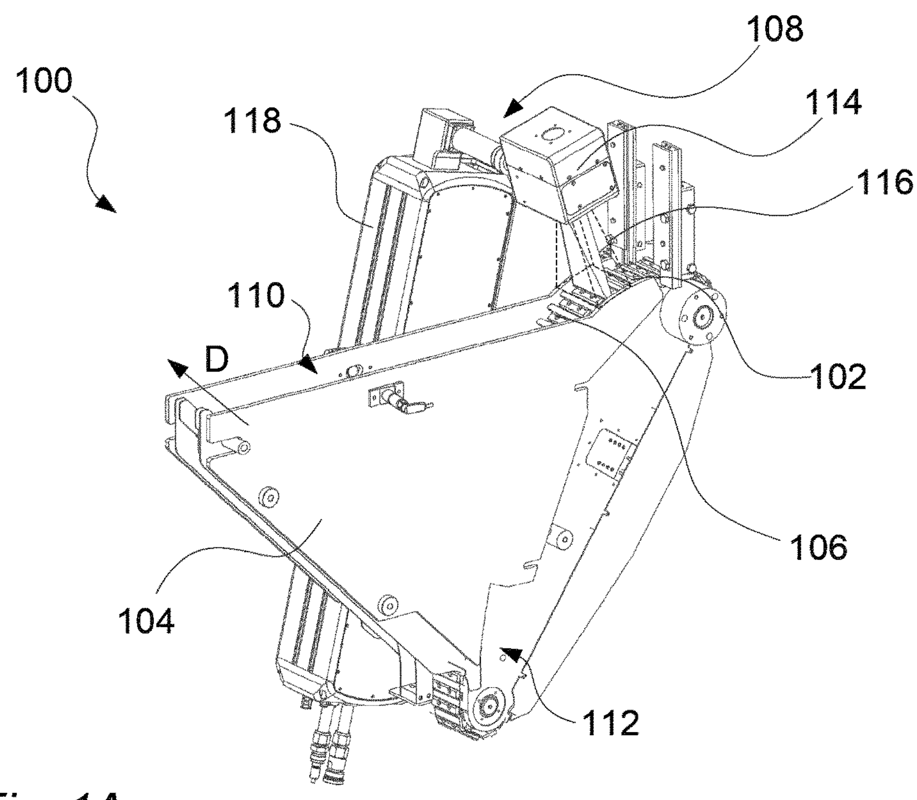
FIG. 1A illustrates a part of a stick handling apparatus.
FIG. 1B illustrates the part illustrated in FIG. 1A without its magazine.

FIG. 1A illustrates a stick handling apparatus 100 by way of example. In this particular example ice cream sticks 102 can be held in a magazine 104. From the magazine 104, the sticks 102 can be picked up by a conveyor band 106. While conveyed on the conveyor band 106, the ice cream sticks 102 can be printed by using a printer unit 108. The sticks 102 are of a type commonly used for ice cream sticks and are typically made of wood.

As illustrated, the conveyor band 106 may be inclined such that the sticks 102 can be moved upwards after these picked up by the conveyor band 106. An advantage with this is that the sticks 102 may be fed from the magazine 104 to the conveyor band 106 by using gravity. When the magazine 104 holds sticks 102 the conveyer band 106 passes the sticks 102 in close contact and picks them up one by one as the sticks 102 fall into a respective slot in the conveyer band 106. The gravity can also provide for that the sticks 102 are aligned on the conveyor band 106.

In the example illustrated in FIG. 1A, an inlet 110 can be provided in an upper end of the magazine 106. By having the inlet 110 placed in this way, an operator can easily inspect that the sticks 102 are correctly placed in the magazine 104 such that a smooth transfer from the magazine 104 to the conveyor band 106 can be achieved. An outlet 112 of the magazine 104 can be provided in a lower end of the magazine 104 and the conveyor band 106 can be provided under the outlet 112 such that the sticks 102 reliably can fall onto the conveyor band 106. The outlet 112 may be provided with a feeding device (not illustrated) providing for that the sticks 102 are fed out one by one.

The printer unit 108 can comprise a printer head 114 that is placed above the conveyor band 106 such that the sticks 102, transferred by the conveyor band 106, can be printed. The printer head 114 can print on sticks provided in a printer beam work zone 116. This zone may be restricted to only one stick, or only a section of a stick, or it may cover an area comprising the stick 102 as well as a preceding area and a subsequent area of the conveyor band 106. The zone 116 may also cover several sticks such that more than one can be printed at the same time. In the example illustrated in FIG. 1A, the printer unit 108 is a laser printer. Thus, in addition to the printer head 114, a laser unit 118 can be provided. The laser unit 118 may be any commercially available laser unit suitable for printing on ice cream sticks made of wood.

FIG. 1B illustrates the same stick handling apparatus 100 as is illustrated in FIG. 1A, but with the magazine 104 removed for illustrative purposes. With the magazine 104 removed, the conveyor band 106 as well as the sticks 102 placed on the conveyor band 106 can easily be seen.

Since the printing with the printer head 114 can be made during movement of the conveyor band 106, a speed S of the conveyor band 106 can be provided as input to the printer unit 108 such that it can adapt printer settings in accordance with the speed S. Such adaptions may comprise e.g. adjusting the printing position in the direction of movement DoM of the sticks 102. The speed S can be measured in different ways, for instance by using a sensor 120 connected to a drive wheel of the conveyor band 106.

To hold the sticks 102 in place, the conveyor band 106 can be provided with slots 121. On the conveyor band 106, there may be void slots 122, that is, slots without sticks. There may be different reasons for the void slots 122. For instance, the magazine 104 may have run empty with the effect that sticks 102 have not been properly fed out from the magazine 104 into the conveyor band 106. Another reason for void slots 122 can be that no stick fell into the slot in the conveyer band 106 when the slot in question passed the magazine 104.

To assure that the printing is aligned with sticks that are present in the slots in the conveyer belt 106 a sensor 124 for detecting slots 122 without sticks 102 may be used. This sensor 124 may generate data D indicative of whether the slots 121 are provided with sticks 102. With this data D at hand, the printer unit 108 can adapt the printing such that no printing is done when an empty slot 122 passes the printer head 114. By having this functionality, a versatile piece of equipment is provided and it can be avoided that printing is made on the conveyor band 106. The sensor 124 for detecting slots 122 can be an individual sensor, or can be the built-in print-trigger sensor that is available in many commercial laser printers.

Figures 2A, 2B:
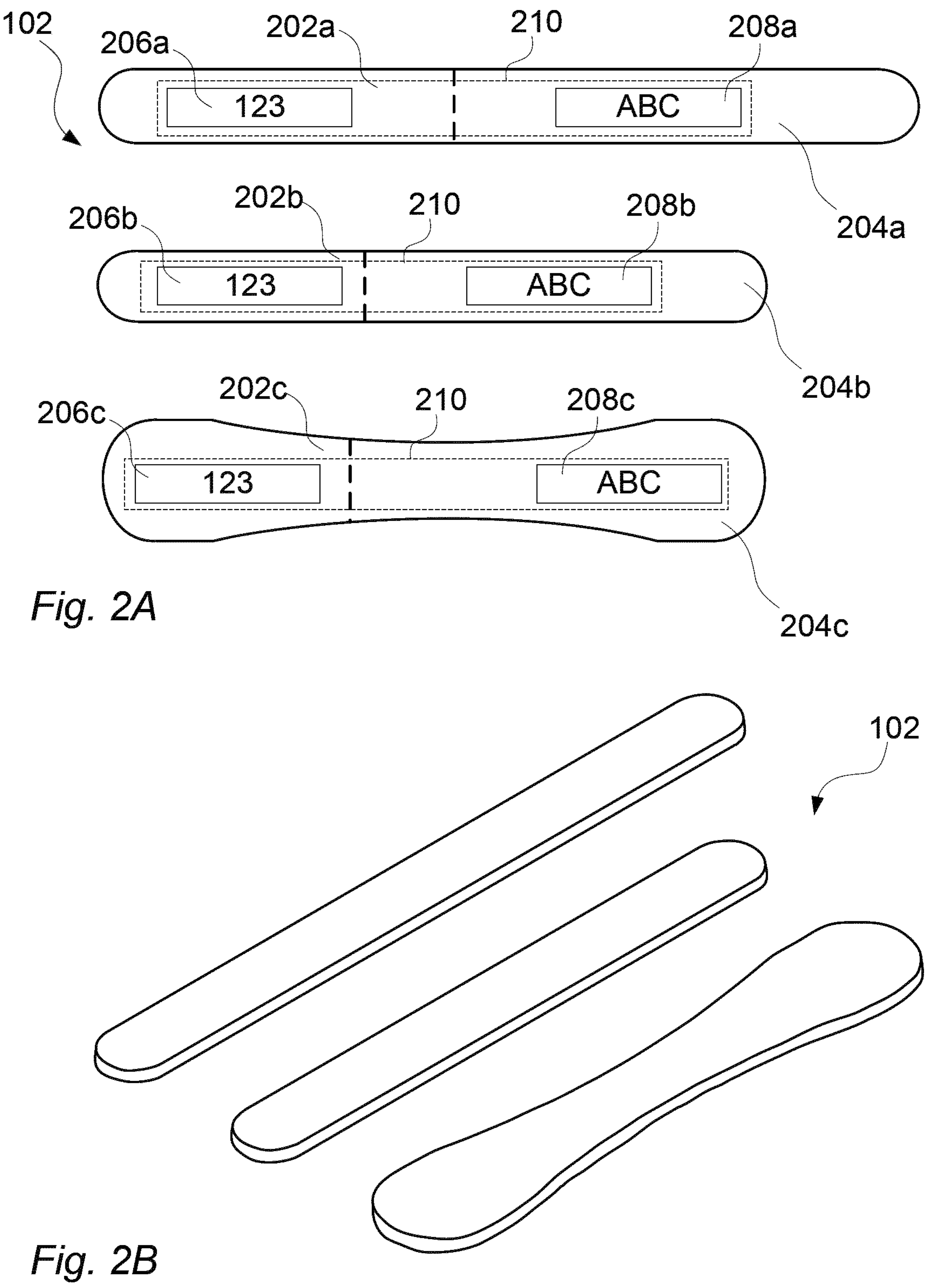
FIG. 2A illustrates three examples of ice cream sticks as seen from above.
FIG. 2B illustrates a perspective view of the three sticks illustrated in FIG. 2A.

FIGS. 2A and 2B illustrates three examples of sticks 102. FIG. 2A illustrates the examples seen from above and FIG. 2B illustrates the examples in a perspective view. The sticks 102 are provided with first ends 202*a-c* and second ends 204*a-c*. The first ends 202*a-c* can be placed inside ice cream mass, while the second ends 204*a-c* can be placed outside the ice cream mass, and as an effect of being outside the ice cream mass it can function as a grip for the consumer.

As illustrated, the first and second ends may differ in size. For different ice cream products more or less of the stick may be inserted into the ice cream mass. Since how much of the stick that is inserted into the ice cream mass can be controlled, it may be decided what print information to have inside the ice cream mass and what print to have outside the ice cream mass. First print 206*a-c*, that is, print on the first ends 202*a-c*, may thus comprise information that is to be made visible to the consumer after the ice cream mass has been consumed, and second print 208*a-c* may comprise information that is visible to the consumer as soon as the ice cream product is unwrapped. The first and second prints 206*a-c*, 208*a-c* combined are herein referred to as information 210.

Figure 3:
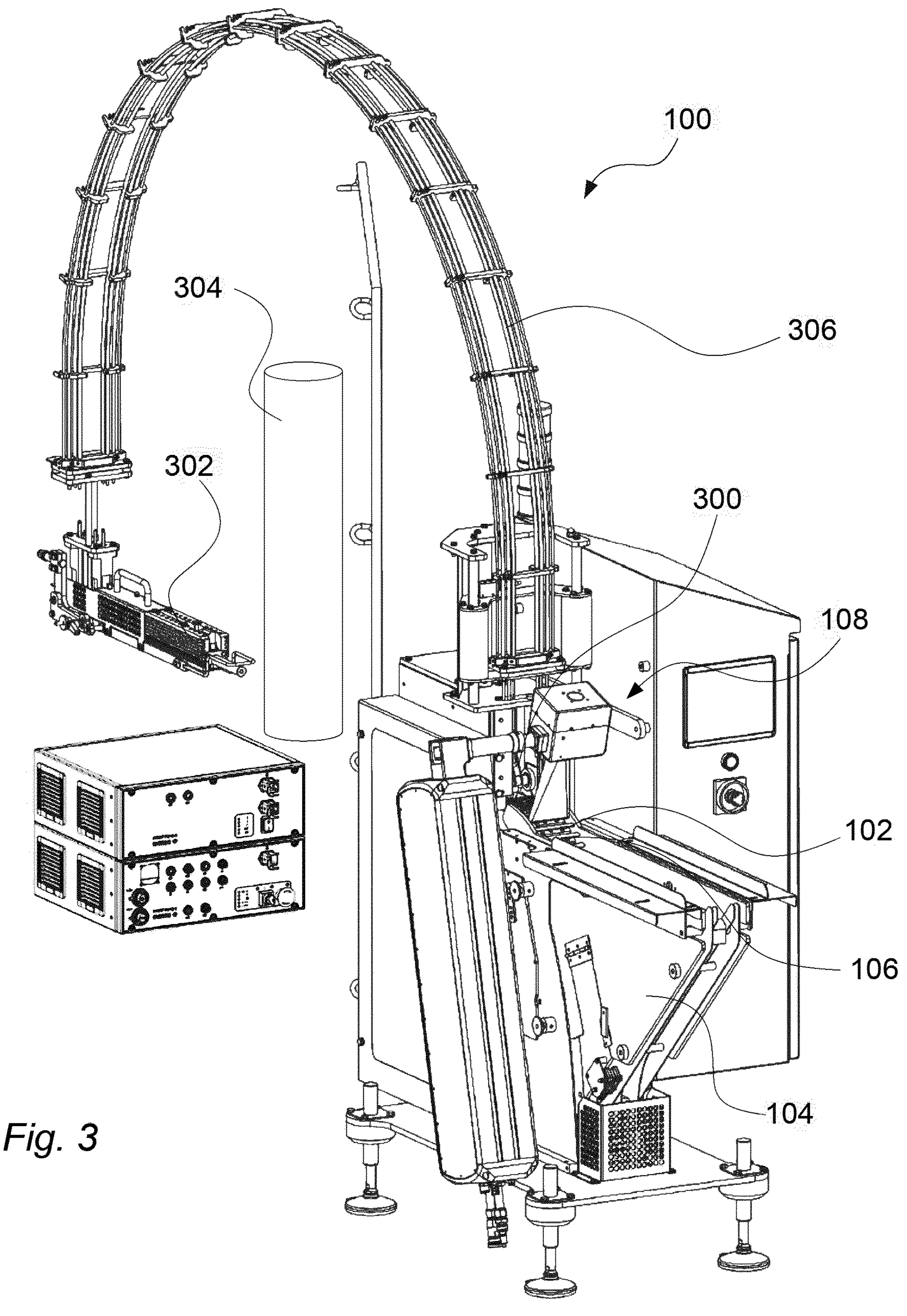
FIGS. 3-5 illustrate stick handling apparatuses according to three different embodiments.

FIG. 3 illustrates the stick handling apparatus 100 illustrated in FIGS. 1A and 1B together with a stacker unit 300 made to retrieve the sticks 102 from the conveyor band 106 and to stack these one after the other. The stacked sticks 102 can be received by a stick placing unit 302 that is arranged to position the sticks 102 in ice cream mass 304. As illustrated in FIG. 3, the positioning may be made by pushing the sticks 102 into the ice cream mass 304, which may be extruded ice cream mass that is later cut in pieces and further processed into ice cream products.

As described above, the stick placing unit 302 may be configured such that the first ends 202*a-c* of the sticks 102 are placed inside the ice cream mass 304.

The sticks 102 may be transported from the stacker unit 300 to the stick placing unit 302 via a stick stack holder 306. As illustrated, the stick stack holder 306 may be a number of arc-shaped rods that guides the stack of sticks from the stacker unit 300 to the stick placing unit 302. To provide versatility, the stack holder 306 may be a so-called a flexible arc, that is, the stack holder 306 is not fixed such that e.g. installation and adjustment can be facilitated. To assure that the first ends 202*a-c* are inserted into the ice cream mass 304, the sticks 102 may be handled throughout the stick handling apparatus 100 with the first ends 202*a-c* facing in the same direction.

Figure 4:
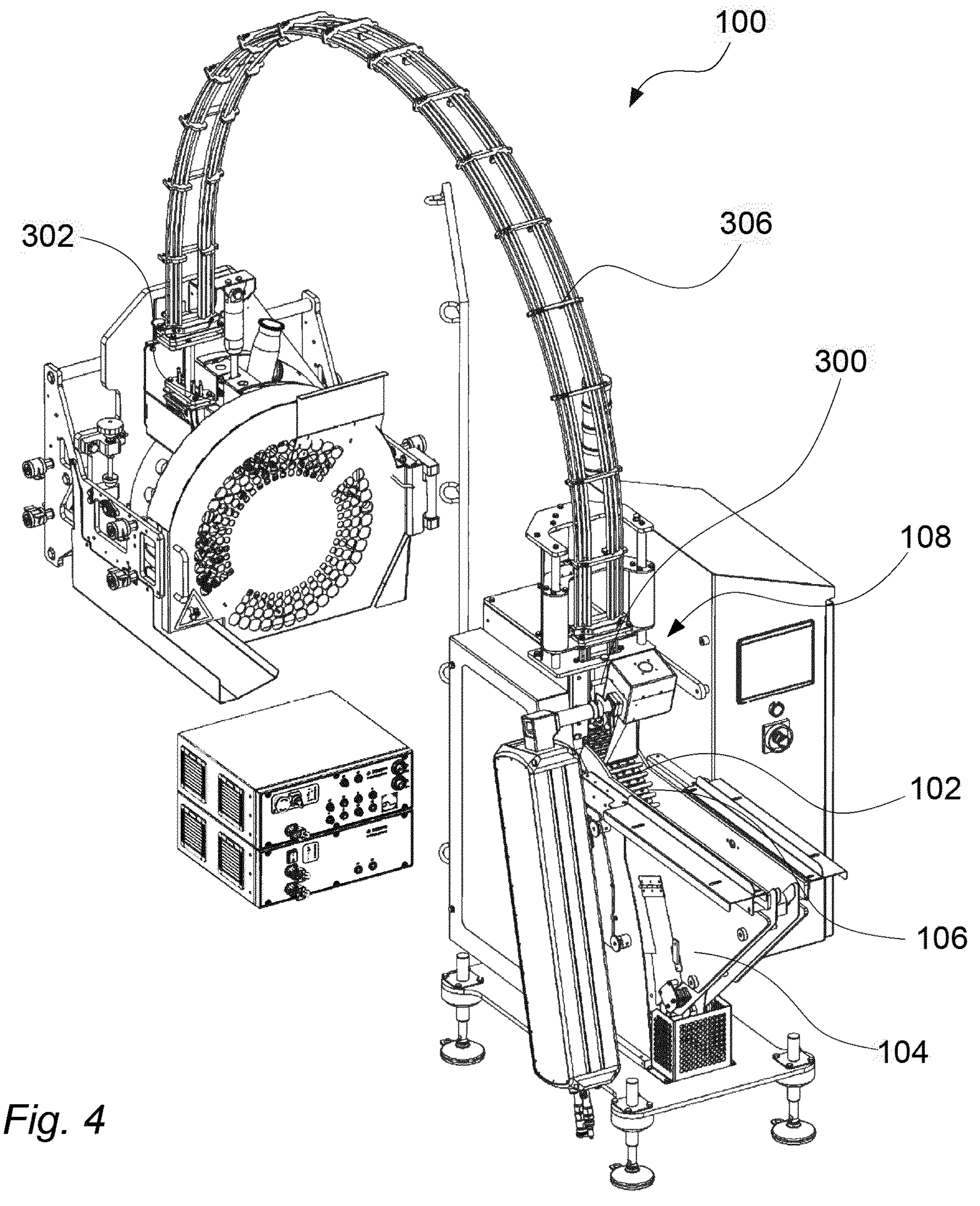

FIG. 4 also illustrates the stick handling apparatus 100 illustrated in FIGS. 1A and 1B, but unlike FIG. 3, the stick placing unit 302 is an extrusion wheel and not a pusher unit as illustrated in FIG. 3. As illustrated, the same stick stack holder 306 as in FIG. 3, i.e. the so-called flexible arc, can be used also when having the stick placing unit 302 embodied as the extrusion wheel.

Figure 5:
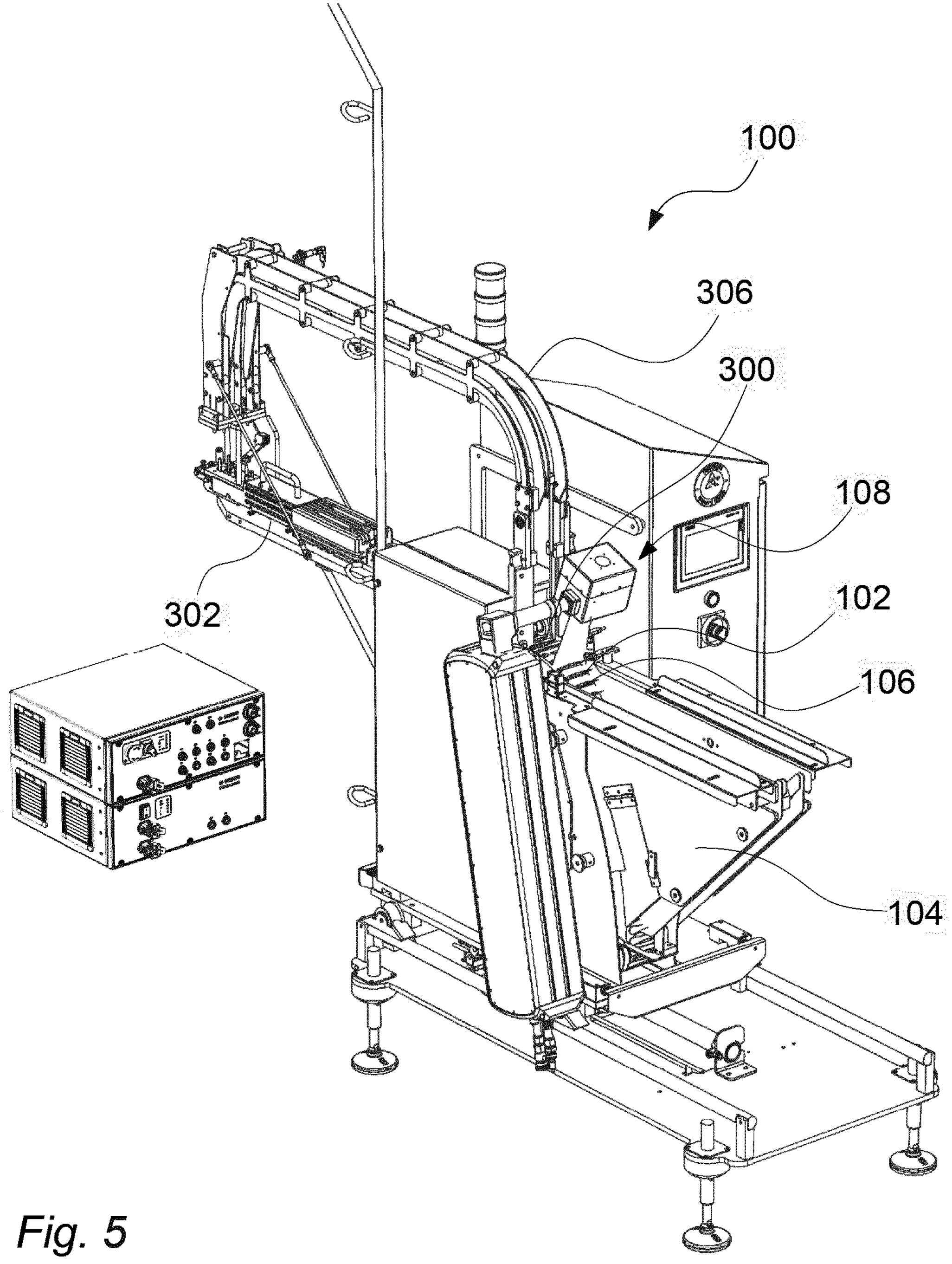

FIG. 5 illustrates yet another example of the stick handling apparatus 100. In line with the example illustrated in FIG. 3, the stick placing unit 302 is the pusher unit, i.e. the stick placing unit 302 is made to push the sticks 102 into the ice cream mass 304. Unlike the examples illustrated in FIGS. 3 and 4, the stick stack holder 306 is in this example a fixed stick stack holder.

Thus, the stick placing units 302 receive the ice cream sticks 102 from the stacker unit 300 for positioning the ice cream sticks 102 inside a piece of ice cream mass 304. This positioning may include pushing the stick into the ice cream (FIG. 3 and or moulding the ice cream around the sticks (FIG. 4). The stick stacker 300 and the different stick placing units 302 are per se commercially available units.

In addition to the examples illustrated in FIGS. 3, 4 and 5, the stick handling apparatus 100 may be also be used in multi-lane systems even though no such examples are illustrated.

Figure 6:
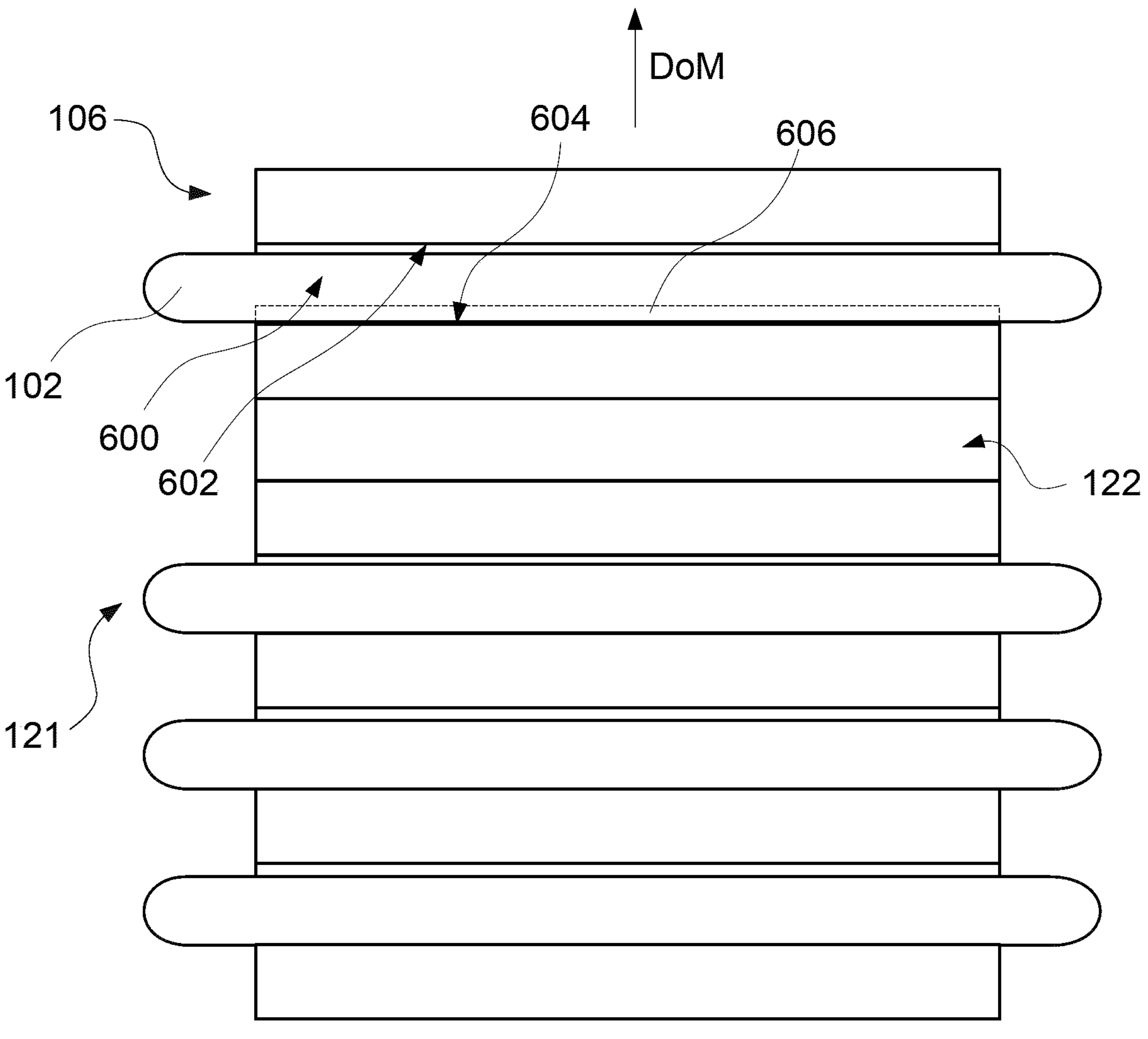
FIG. 6 illustrates a conveyor band in further detail.

FIG. 6 illustrates a part of the conveyor band 106 in further detail. As illustrated in FIG. 1, the slots 121 may hold the sticks 102, but there may also be slots 122 without sticks, also referred to as void slots.

To provide a print that is aligned with the geometry of the stick 102, the conveyor band 106 can be arranged such that alignment of the sticks 102 is made possible. As illustrated in FIGS. 1A and 1B, the conveyor band 106 can be inclined, which provides for that the gravity can be used for achieving the alignment. As illustrated in FIG. 6, this may be made by having each slot 121 provided with a first wall 602 and a second wall 604, wherein the second wall 604 is, as seen in a direction of movement DoM of the conveyor band 106, trailing the first wall 602. A longitudinal side 606 of the stick 102 can fall down onto the second wall 604, as an effect of the gravity, such that it is supported by the second wall 602. As an effect of the support, the stick 102 is also aligned, which has the advantage that position of the print on the stick 102 can be made with improved precision.

Figure 7:
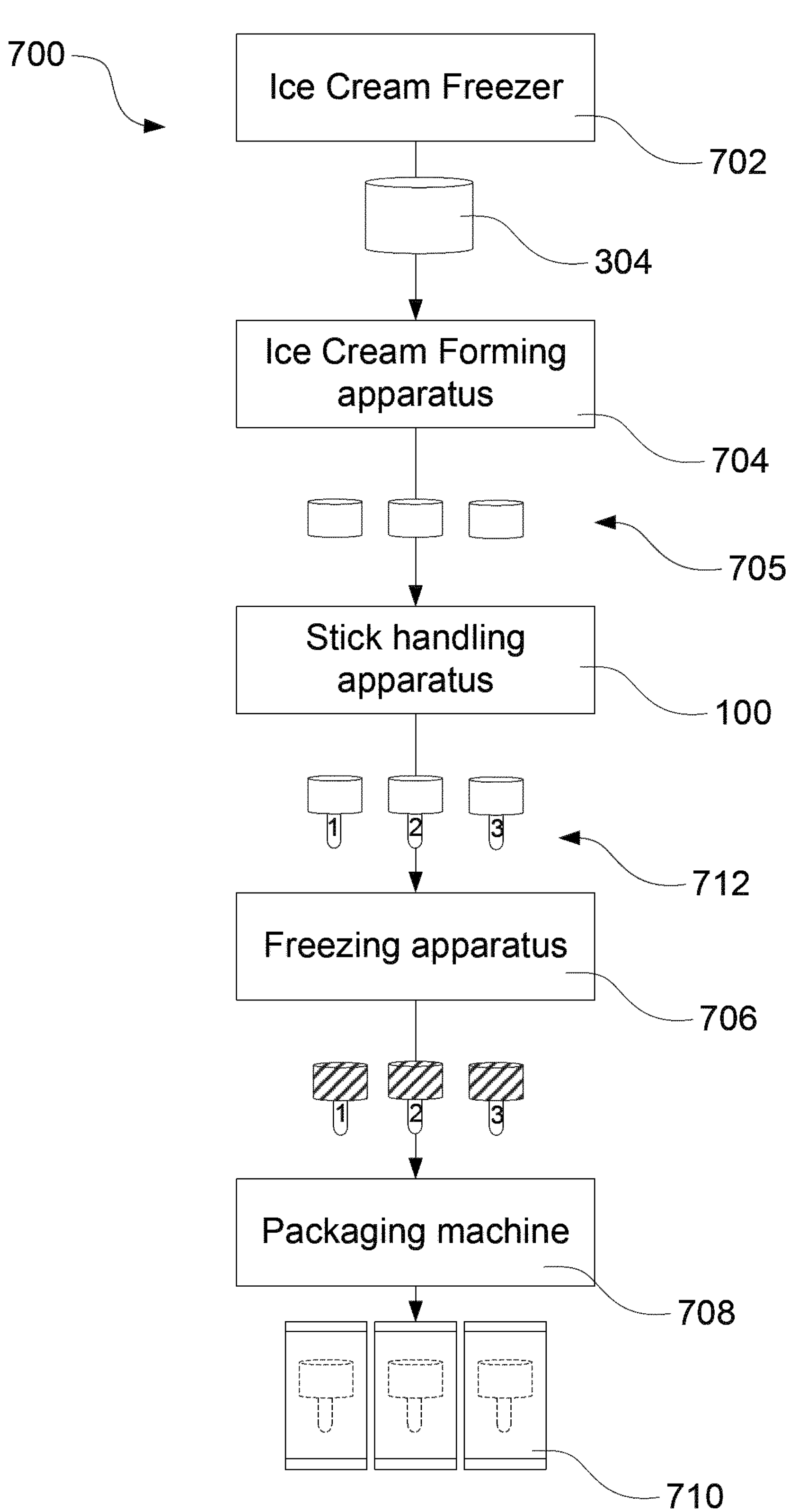
FIG. 7 illustrates an ice cream production system.

FIG. 7 generally illustrates an ice cream production system 700. In short, based on cream, sugar and other ingredients, ice cream mass 304 can be produced by using an ice cream freezer 702. The ice cream mass 304 may thereafter be formed in an ice cream forming apparatus 704 into individual pieces 705 of ice cream mass. As illustrated above, this may be made in different ways, e.g. by using extrusion or moulding, which means placing the sticks in a mould and thereafter fill up the mould with ice cream mass. The individual pieces 705 may be provided by sticks 102 by using the stick handling apparatus 100. As discussed above, the stick handling apparatus 100 may place the sticks in the individual pieces 705 in a number of different ways, and it may also, e.g. when using extrusion, be made before the ice cream mass 304 is divided into the individual pieces 705. In addition to placing the sticks 102 in the individual pieces 705, the sticks 102 can be printed.

After being provided with sticks 102, the individual pieces 705 may be placed in a freezing apparatus 706, e.g. a freezing tunnel. Lastly, in a packaging machine 708, the individual pieces 705 can be wrapped in package material 710 such that ice cream products ready to be shipped are formed.

To be able to trace the different ice cream products, which may be beneficial from food safety perspective as well as quality perspective, the printer unit 108 can be configured to provide different prints on each ice cream stick 102 of a set of ice cream sticks 712. For instance, a unique code may be provided on each stick. The set of ice cream sticks 712 may be a batch produced for a specific purpose, but it may also include the ice cream products produced at different sites provided that information is shared between the different sites.

Figure 8:
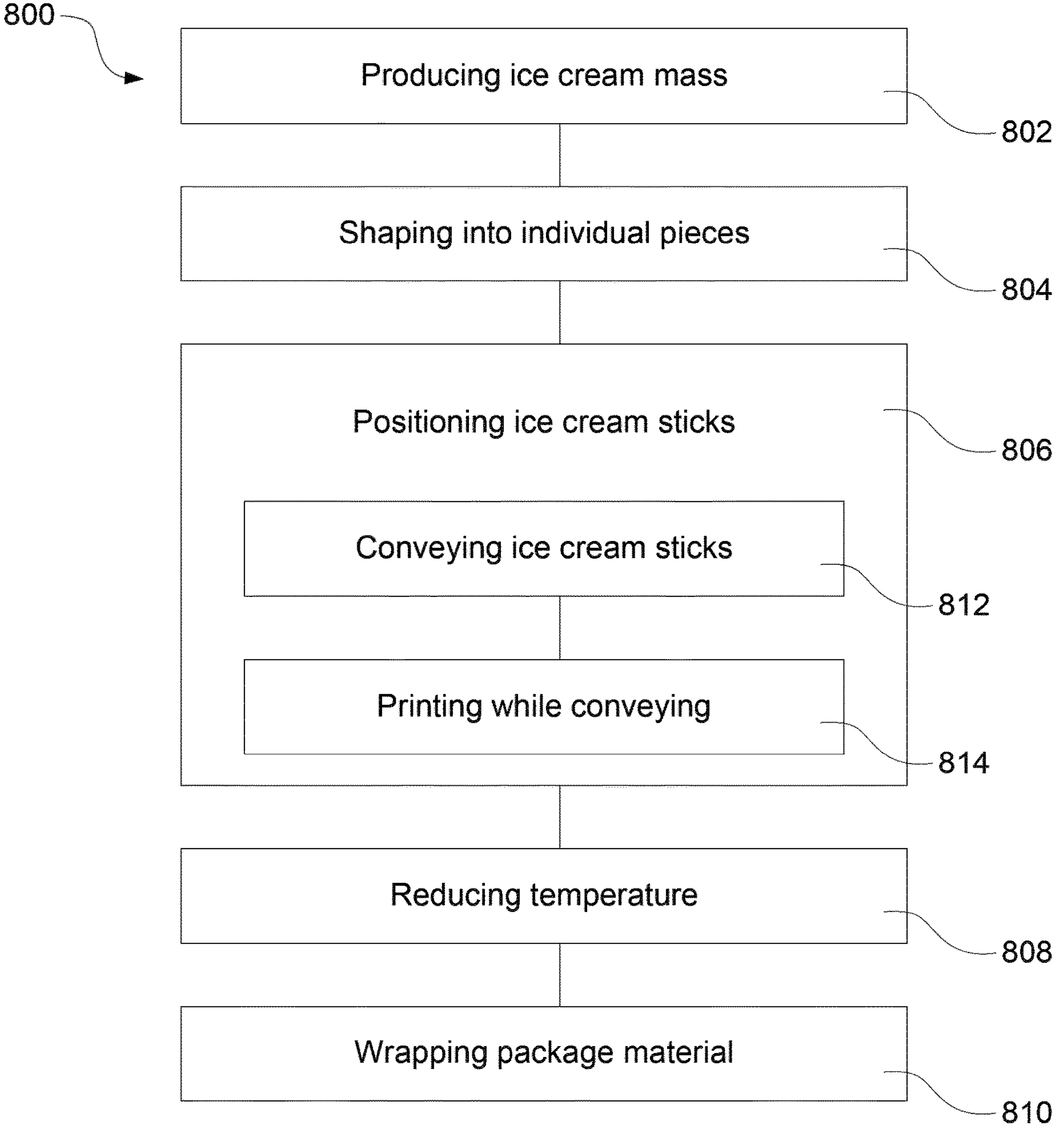
FIG. 8 is a flowchart illustrating a method for producing ice cream.

FIG. 8 is a flowchart illustrating a method 800 for producing ice cream. In a first step 802, the ice cream mass 304 is produced. In a second step 804, the ice cream mass 304 can be shaped into the individual pieces of ice cream mass 705. In a third step 806, the ice cream sticks 102 are positioned inside each individual piece of ice cream mass 705 using the stick handling apparatus 100. In a fourth step 808, the temperature of the individual pieces of ice cream mass 705 can be reduced. In a fifth step 810, each individual piece of ice cream mass 705 can be wrapped in the package material 710.

The third step 806 may comprise a first sub-step 812 in which the ice cream sticks 102 can be conveyed in the stick handling apparatus 100 on the conveyor band 106 from the magazine 104 to the stacker unit 300, and a second sub-step 814 in which the information 210 can be printed on the ice cream sticks 102 while the ice cream sticks 102 are conveyed by the conveyor band 106.

As described above, ice cream products can be produced in various ways and even though described in a particular order, the different steps may also be performed in other orders. For instance, in case of using extrusion, the third step 806 may be performed before the second step 804, that is, the sticks 102 may be placed in the ice cream mass 304 before this is made into individual pieces of ice cream mass 705. However, the fourth and fifth step 808, 810 are most often made after the third step 806.

From the description above follows that, although various embodiments of the invention have been described and shown, the invention is not restricted thereto, but may also be embodied in other ways within the scope of the subject-matter defined in the following claims.

The invention claimed is:

1. A stick handling apparatus for handling ice cream sticks, said apparatus comprising
- a magazine arranged to hold ice cream sticks,
- a conveyor band arranged to retrieve ice cream sticks from the magazine,
- a stacker unit arranged to retrieve ice cream sticks from the conveyor band and to stack the ice cream sticks one after the other,
- a stick placing unit arranged to receive the ice cream sticks from the stacker unit for positioning the ice cream sticks inside a piece of ice cream mass to form an ice cream product, wherein
- a printer unit configured to print information on the ice cream sticks while the ice cream sticks are conveyed by the conveyor band, wherein the printed information enables traceability of the ice cream product.

2. The stick handling apparatus according to claim 1, comprising a sensor arranged to detect a speed by which the ice cream sticks are conveyed by the conveyor band, wherein the printer unit is configured to use said speed as input when printing information on the ice cream sticks.

3. The stick handling apparatus according to claim 1, wherein the conveyor band comprises slots that are arranged to hold a respective ice cream stick, the apparatus further comprising a sensor arranged to generate data indicative of absence of a stick in a slot, wherein the printer unit is configured to use said data as input when printing information on the ice cream sticks.

4. The stick handling apparatus according to claim 1, wherein
- each ice cream stick comprises a first end and a second end,
- the printer unit is configured to provide different prints on the two ends of each ice cream stick, and
- the conveyor band, the stacker unit and the stick placing unit are arranged to convey, stack and place all ice cream sticks such that all first ends of the ice cream sticks face the same direction and are positioned inside a respective piece of ice cream mass.

5. The stick handling apparatus according to claim 1, wherein the printer unit is configured to provide different prints on each ice cream stick of a set of ice cream sticks.

6. The stick handling apparatus according to claim 1, wherein the printer unit is a laser printer.

7. The stick handling apparatus according to claim 1, wherein the conveyor band comprises slots that are arranged to hold a respective ice cream stick, each slot comprising a first wall and a second wall that is opposite the first wall, wherein the second wall is, as seen in a direction of movement of the conveyor band, trailing the first wall, and is arranged to support a longitudinal side of an ice cream stick.

8. A stick handling apparatus for handling ice cream sticks, said apparatus comprising
- a magazine arranged to hold ice cream sticks,
- a conveyor band arranged to retrieve ice cream sticks from the magazine,
- a stacker unit arranged to retrieve ice cream sticks from the conveyor band and to stack the ice cream sticks one after the other,
- a stick placing unit arranged to receive the ice cream sticks from the stacker unit for positioning the ice cream sticks inside a piece of ice cream mass,
- a printer unit configured to print information on the ice cream sticks while the ice cream sticks are conveyed by the conveyor band, and
- a sensor arranged to detect a speed by which the ice cream sticks are conveyed by the conveyor band, wherein the printer unit is configured to use said speed as input when printing information on the ice cream sticks.

* * * * *